(12) United States Patent
Bernard et al.

(10) Patent No.: US 6,655,079 B1
(45) Date of Patent: Dec. 2, 2003

(54) INSECT BAIT STATION

(76) Inventors: Alan S. Bernard, 8885 SW. 7th St., Boca Raton, FL (US) 33488; Michael M. Anthony, 10189 W. Sample Rd., Coral Springs, FL (US) 33065

( * ) Notice: Subject to any disclaimer, the term of this patent is extended or adjusted under 35 U.S.C. 154(b) by 0 days.

(21) Appl. No.: 10/285,257

(22) Filed: Oct. 31, 2002

(51) Int. Cl.[7] ................................................ A01M 1/20
(52) U.S. Cl. ............................ 43/131; 43/107; 43/132.1
(58) Field of Search ........................... 43/107, 108, 121, 43/124, 131, 322.1, 55, 56

(56) References Cited

U.S. PATENT DOCUMENTS

| | | | | |
|---|---|---|---|---|
| 2,632,280 A | * | 3/1953 | Heim | 43/121 |
| 3,108,391 A | * | 10/1963 | Sipos | 43/113 |
| 3,466,789 A | * | 9/1969 | Kare | 43/131 |
| 3,619,934 A | * | 11/1971 | Tunstall et al. | 43/131 |
| 4,648,201 A | | 3/1987 | Sherman | |
| 4,660,320 A | * | 4/1987 | Baker et al. | 43/131 |
| 4,782,621 A | | 11/1988 | Wissman | |
| 4,793,093 A | | 12/1988 | Gentile | |
| 4,802,303 A | * | 2/1989 | Floyd, III | 43/131 |
| 4,841,669 A | | 6/1989 | Demarest | |
| 5,048,225 A | * | 9/1991 | Brandli | 43/131 |
| 5,152,097 A | * | 10/1992 | Rhodes | 43/132.1 |
| 5,501,033 A | | 3/1996 | Wefler | |
| 5,586,406 A | * | 12/1996 | Lin et al. | 43/55 |
| 5,875,586 A | | 3/1999 | Ballard | |
| 5,943,816 A | | 8/1999 | Hyatt | |
| 5,953,854 A | | 9/1999 | Hyatt | |
| 6,041,542 A | | 3/2000 | Payton | |
| 6,151,828 A | * | 11/2000 | Genero et al. | 43/131 |
| 6,189,259 B1 | | 2/2001 | Soller | |
| 6,195,933 B1 | | 3/2001 | Woodruff | |
| 6,502,348 B2 | * | 1/2003 | Bernard | 43/131 |

* cited by examiner

*Primary Examiner*—Michael J. Carone
*Assistant Examiner*—Susan L Piascik
(74) *Attorney, Agent, or Firm*—Mark D. Brown, Esq.; Stearns Weaver Miller Weissler Alhadeff & Sitterson, P.A.

(57) ABSTRACT

A spill resistant insect bait station particularly adapted for use with liquid or gel insecticide consists of a generally cylindrical housing having an open end, a closed end, and a removable end cap assembly adapted for removable attachment with said open end. The housing interior functions as a reservoir for liquid or gel bait formulations, such as attractants and toxicants. Axial apertures formed in the housing ends provide insects with access to the interior of the housing through a series of openings defined in the walls of internal tube and shaft structures. A spiral baffle projects radially outward from the shaft for sealing engagement with the inner wall of the tubular structure to prevent spillage of liquid bait, while defining a passage for insects leading to the liquid bait. A series of offset openings in the shaft and tube walls provide access to the housing interior.

7 Claims, 8 Drawing Sheets

INSECT BAIT STATION

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to devices for use in exterminating pests, and more particularly to a spill resistant insect bait station adapted for refillable containment of a liquid, gel, or granular attractant and/or toxicant for exterminating insect pests.

2. Description of the Background Art

Human populations have long encountered problems co-existing with various insects, particularly ants. There are more than ten thousand species of ants, a number of which infest structures, lawns, parks, and other areas frequented by humans. The various species of ants vary widely in many respects including size, color, shape, distribution, food preference, and nest locations. A particularly problematic species of ant is the fire ant. Fire ant colonies have become prevalent throughout the southeastern United States and pose a serious problem. The presence of fire ant colonies in lawns, parks, and other areas populated and/or routinely used by humans is a nuisance and a hazard due to the fire ant's painful sting, coupled with its tendency to attack in numbers. In addition, other species of ants routinely disrupt activities in homes, offices, and parks. As a result, controlling insect populations is therefore necessary.

A primary means of pest control involves the use of toxicants, particularly liquid poison. The spraying of liquid poison is a common method of pest control. Spraying liquid poison, however, involves a number of inherent disadvantages. A primary disadvantage involves the risk of exposing humans to the toxic chemical formulations. Furthermore, spraying poison is often harmful to the environment and often causes damage to vegetation and other animal species in addition to the targeted pest population. In addition, liquid poison that has been applied by spraying often degrades over time and/or is washed away by rain or irrigation water thereby reducing effectiveness and requiring repeated treatment and/or the use of greater quantities.

For these and other reasons it has been found preferable to contain liquid or gel toxicants in bait stations, which stations provide structures that contain the poison while providing access to insects.

The background art reveals a number of attempts directed to pest control.

The following patents provide examples of these attempts.

| | | | |
|---|---|---|---|
| 4,648,201 | Sherman | 5,875,586 | Ballard et al. |
| 4,782,621 | Wissman | 5,943,816 | Hyatt et al. |
| 4,793,093 | Gentile | 5,943,817 | Miller |
| 4,823,506 | Demarest et al. | 5,953,854 | Hyatt |
| 4,841,669 | Demarest et al. | 5,983,558 | Las et al. |
| 5,446,992 | Stewart | 6,041,542 | Payton et al. |
| 5,501,033 | Wefler | 6,189,259 | Soller |
| 5,775,026 | Pearce et al. | 6,195,933 | Woodruff |
| 5,802,761 | Demarest et al. | 6,216,384 | Dickson et al. |

U.S. Pat. No. 4,793,093, issued to Gentile, discloses a feeding station for vermin that allows for ingress of the vermin to feed on poisoned bait held at a central portion therein. The bait is contained within a central well and ingress is facilitated by an inclined ramp leading to the chamber. A cover is joined to the top of the base member to cover the central well holding the poisoned bait.

U.S. Pat. Nos. 4,823,506 and 4,841,669, issued to Demarest et al., each disclose an insect bait device for exterminating crawling insects. The devices comprise first and second housing portions joinable to form a housing that defines generally unobstructed entry into the device by an insect. U.S. Pat. No. 5,802,761, also issued to Demarest et al., discloses a bait station including a base defining a bait-cup and a cover fastened to the base. The cover and base cooperate to form a door and walkway to admit targeted insects to enter the bait station thus gaining access to the bait cup.

U.S. Pat. No. 5,501,033, issued to Wefler, discloses a liquid delivery bait station having two reservoirs and fluid transfer systems to allow sequential delivery of two liquids. The liquids are preferably an insect attractant that is first delivered into an absorbent feeding pad and an insect toxicant that is next delivered to the absorbent pad.

U.S. Pat. No. 5,775,026, issued to Pearce et al., discloses an insect bait station for attracting and killing insects that comprises a substantially flat configuration with insecticide formulated as a solid coating on the surface of a sheet of moisture free material, and one or more breakable ampoules containing an attractant composition. The ampoules are held in a compressible portion of the housing permitting them to be manually broken to discharge their contents on command thereby releasing attractant vapors.

U.S. Pat. No. 5,875,586, issued to Ballard et al., discloses a refillable liquid bait station formed to allow access by insects, but not by larger animals. The bait station includes a transparent housing that protects the liquid bait from wind and rain and which further prevents leakage if the bait station is tumbled and/or placed in an incorrect position by use of a series of inner walls and chambers.

U.S. Pat. No. 5,943,816, issued to Hyatt et al., discloses an insect bait station for delivering a liquid toxicant. The bait station includes a reservoir, a feeding disk with capillary feeding pores, and a base that seals the feeding pores when configured in a closed position. U.S. Pat. No. 5,953,854, also issued to Hyatt, discloses a spill resistant granular bait station having a tunnel entrance leading to an interior bridged member having an inner wall leading from the bottom surface to an inner surface having an access opening in the bridge member leading to a bait source contained within the station. A cover defines a recessed portion thereon closely cooperating with the access opening in the base.

U.S. Pat. No. 6,041,542, issued to Payton et al., discloses a spill-resistant liquid bait station for dispensing liquid bait. The liquid bait is contained in a reservoir at the bottom of the bait station base and a lid is secured over the end of the base. The interior of the bait station is configured for containing the liquid bait if the bait station is inverted. Insects enter the bait station through one or more access ports and then travel through an interior passageway to the liquid bait.

U.S. Pat. No. 6,189,259, issued to Soller, discloses an insect bait-and-switch liquid delivery apparatus for the control of insects. The apparatus includes a reservoir defining a first chamber containing a liquid attractant and a second chamber containing a liquid toxicant. A first feeding station is provided in the first chamber and a second feeding station is provided in the second chamber. A passageway connects the first and second chambers, and an access port is disposed to initially prevent or limit access of an insect to the second feeding station during an initial feeding period and the subsequently enable access to the second feeding station via the passageway after the initial feeding period.

U.S. Pat. No. 6,195,933, issued to Woodruff, discloses a bait station for delivery of liquid insecticide formed from a base having at least one feeding station and a reservoir for storing liquid beneath the base. The insecticide is transferred by capillary action from the reservoir to the feeding station via a connecting tube.

U.S. Pat. No. 6,216,384, issued to Dickson et al., discloses an insect bait station having a continuous outer wall leading from a base to an upper annular surface having a central axial recessed opening therein leading down to a bait source contained in the interior of the station. The interior of the station defines an inverted conical concave part for concentrating the bait to the lowest point of the cone in proximity with an opening in the bottom of the central axial recessed opening.

Many of the prior art bait stations are not suitable for use with liquid insecticide and thus possess significant limitations. Those bait stations that claim to be suitable for use with liquid insecticides are burdened with a number of inherent disadvantages, including overly complex and inefficient structures, and generally fail to disclose an effective bait station that is both spill-resistant while remaining easily refillable.

BRIEF SUMMARY OF THE INVENTION

The present invention provides an insect bait station particularly adapted for use with liquid, gel, or granular insecticides. The insect bait station of the present invention is highly spill resistant and easily refillable, and is effective in both vertical and horizontal configurations. An insect bait station according to the present invention consists of a housing having an open end, a closed end, and a removable end cap assembly adapted for removable engagement with said open end. The housing further includes an internal, axially aligned hollow tubular structure having a first end connected to the housing base in surrounding relation with an axial aperture formed in the base, and a second end aligned for termination coextensive with the open end of the housing. The end cap includes an axially projecting hollow shaft, sized for insertion within the tubular structure. The shaft has a first end connected to the end cap in surrounding relation with an axial aperture formed therein, and a second end adapted for locking inserted engagement with the end plate aperture. The housing interior functions as a reservoir for liquid, gel, or granular bait formulations, such as attractants and toxicants. The axial apertures formed in the housing ends provide insects with access to the interior of the housing through a series of openings defined in the walls of the respective tube and shaft structures. A spiral baffle projects radially outward from the shaft for sealing engagement with the inner wall of the tubular structure to prevent spillage of liquid bait, while defining a passage for insects leading to the liquid bait. A series of offset openings in the shaft and tube walls provide access to the housing interior. Insects enter the bait station through either one of the apertures formed in the housing ends and, by following passages defined within the station, are able to access and hence become exposed to the bait contained therein.

Accordingly, it is an object of the present invention to provide an improved insect bait station.

Still another object of the present invention is to provide a spill resistant liquid insect bait station.

Another object of the present invention is to provide an insect bait station that is not dangerous to children or pets.

Yet another object of the present invention is to provide a spill resistant liquid insect bait station that is effective in both horizontal and vertical configurations.

Still another object of the present invention is to provide an insect bait station that is easy to assemble, disassemble, and clean.

A further object of the present invention is to provide a liquid insect bait station that includes means for guiding insects toward the bait while preventing liquid bait from spilling from the station regardless of the orientation or tumbling of the station.

Still further objects and advantages will become apparent from a consideration of the ensuing description and drawings.

DETAILED DESCRIPTION OF THE INVENTION

The invention will further be described with reference to the drawings wherein the same number in the various figures has identical meaning. FIGS. 1–8 depict a preferred embodiment of an insect bait station according to the present invention, generally referenced as 10, particularly adapted for use with liquid, gel, or granular bait formulations, which formulations may include attractants or toxicants/insecticides. The present invention provides a spill resistant bait station having an internal reservoir for containing bait, such as a liquid toxicant and/or attractant. The bait may further comprise a gel, granular material, or any other suitable form of insecticide. Internal chambers and walls are specifically configured to prevent spillage of liquid bait contained in an internal reservoir while permitting insects to enter the bait station and become exposed to an enclosed insecticide toxicant. Bait station 10 may be fabricated from injection-molded plastic, or any suitable material.

Figure 1:
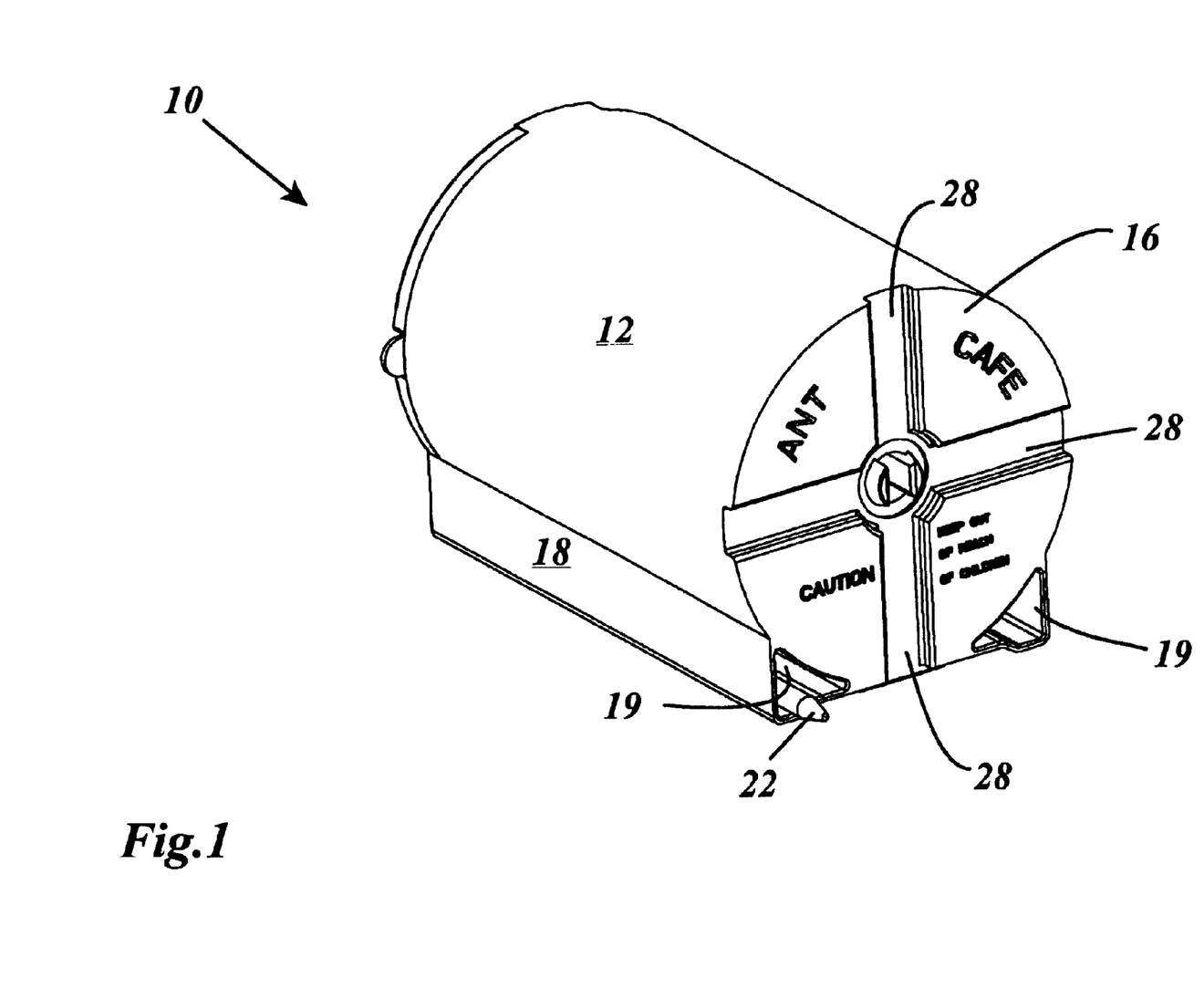
FIG. 1 is a rear perspective view of an insect bait station according to the present invention.
Figure 2:
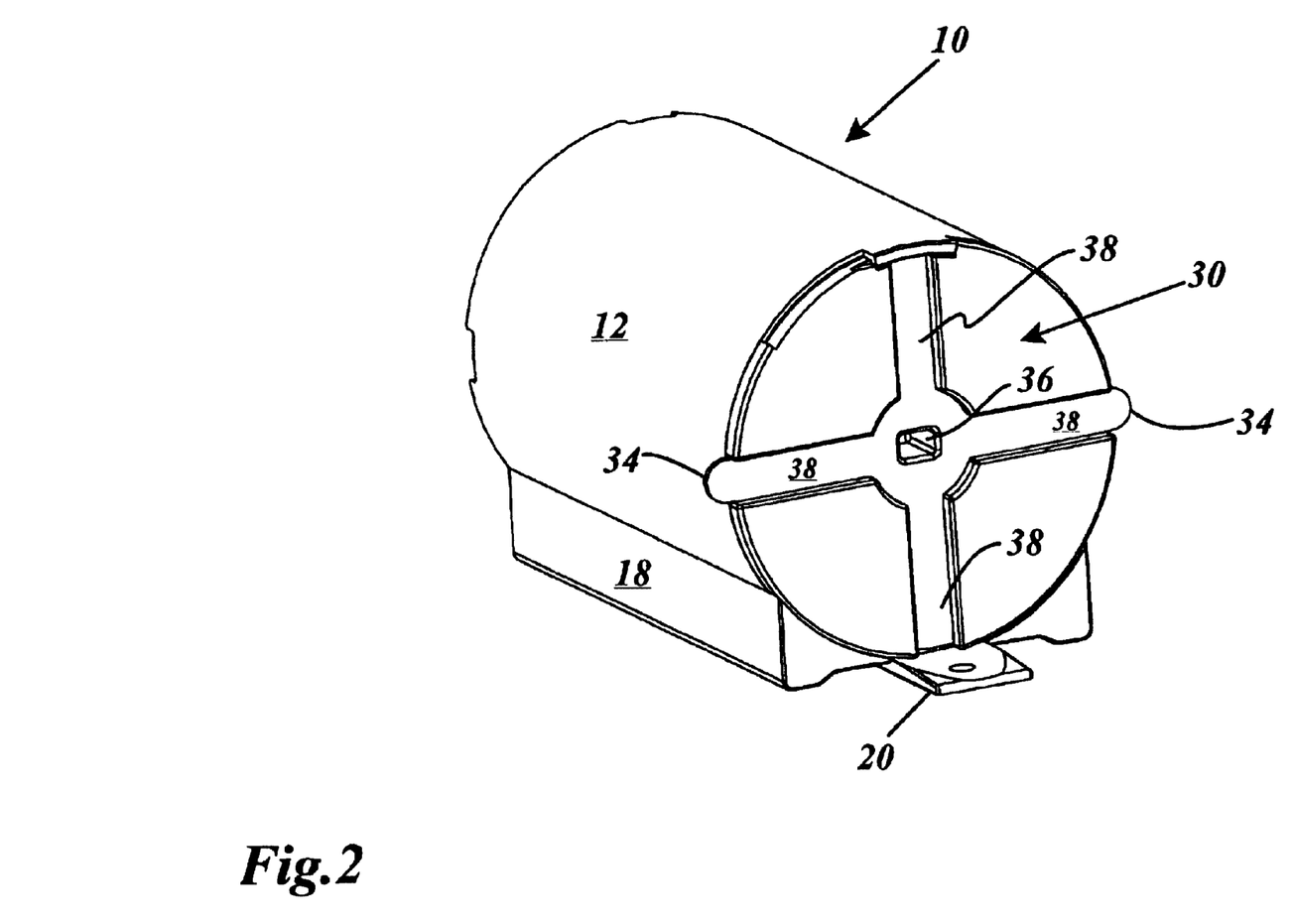
FIG. 2 is front perspective view thereof.
Figure 7:
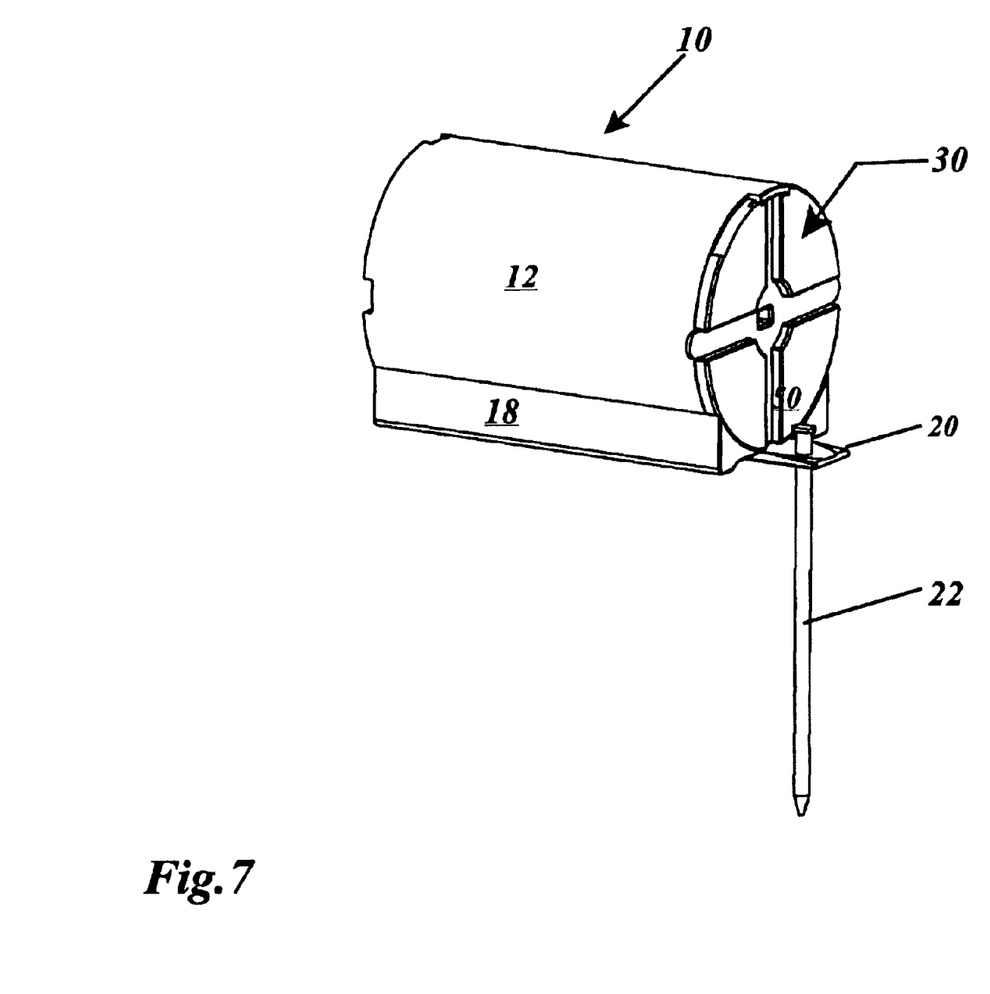
FIG. 7 is a side perspective view depicting an anchoring spike deployed.

In a preferred embodiment, insect bait station 10 includes a housing 12 defining a main interior chamber for containing a liquid or granular bait formulations. In a preferred embodiment, housing 12 is generally cylindrical, however, any suitable shape, whether square, rectangular or any other suitable shape is considered within the scope of the present invention. Housing 12 preferably includes an open end 14, a closed end formed by an end plate 16, a base 18, and a removable end cap assembly, generally referenced as 30. Base 18 functions to stabilize bait station 10 on an underlying generally planar surface, such as a floor, when in the horizontal orientation depicted in FIG. 1. Base 18 may define a projecting tab 20 defining an aperture therein for receiving an elongate rigid anchor 22, such as spike of nail, for anchoring bait station 10 in either a horizontal or vertical configuration. Base 18 further defines an elongate opening 19 therein for removably receiving anchor 22 for storage as best seen in FIG. 1. As best depicted in FIG. 7, anchor 22 functions to secure bait station 10 at any given location by inserted engagement with tab 20 projecting from housing 12. Anchor 22 may comprise a metal or plastic spike, threaded fastener, or any suitable anchoring device.

Figure 3:
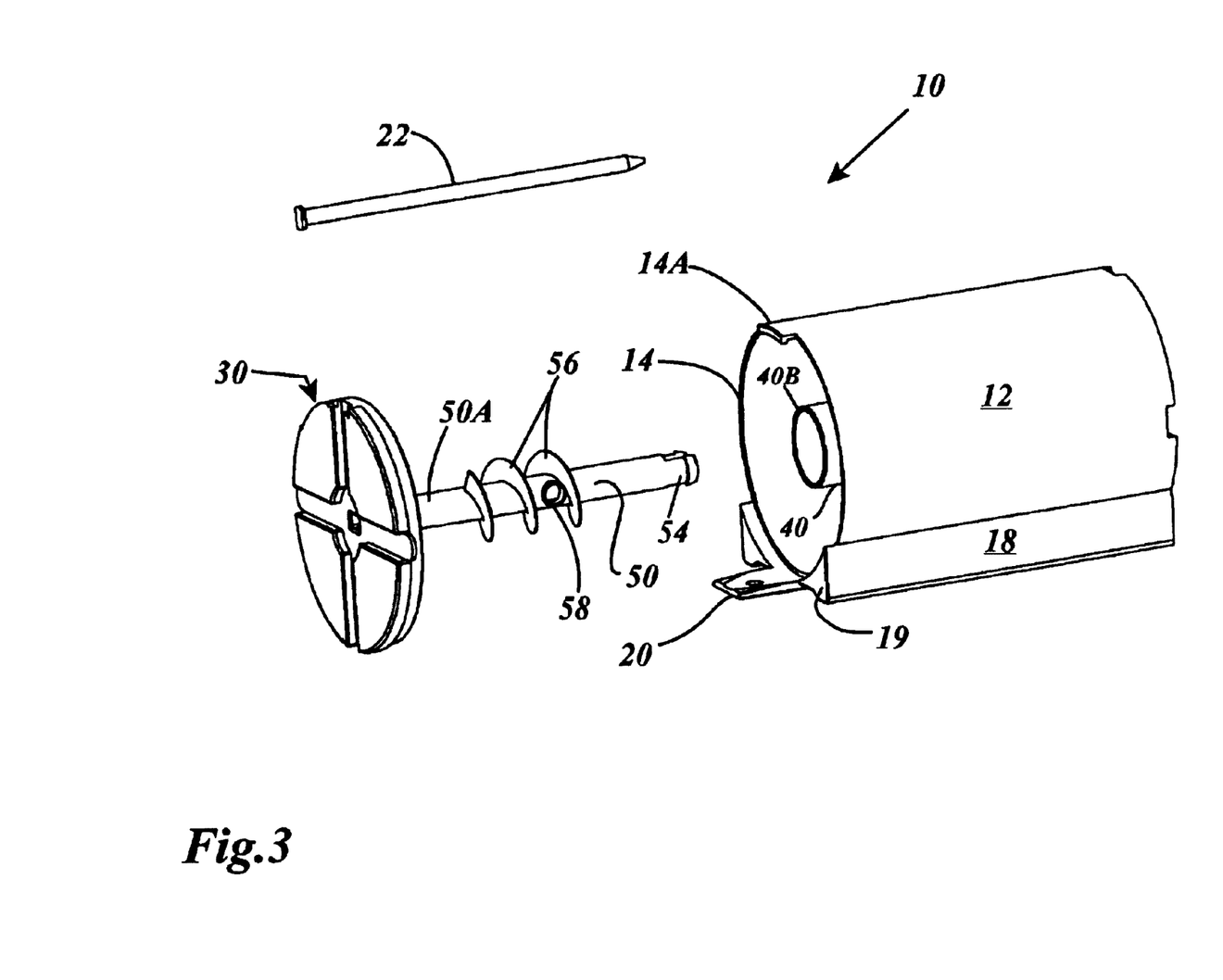
FIG. 3 is an exploded side perspective view thereof.
Figure 5:
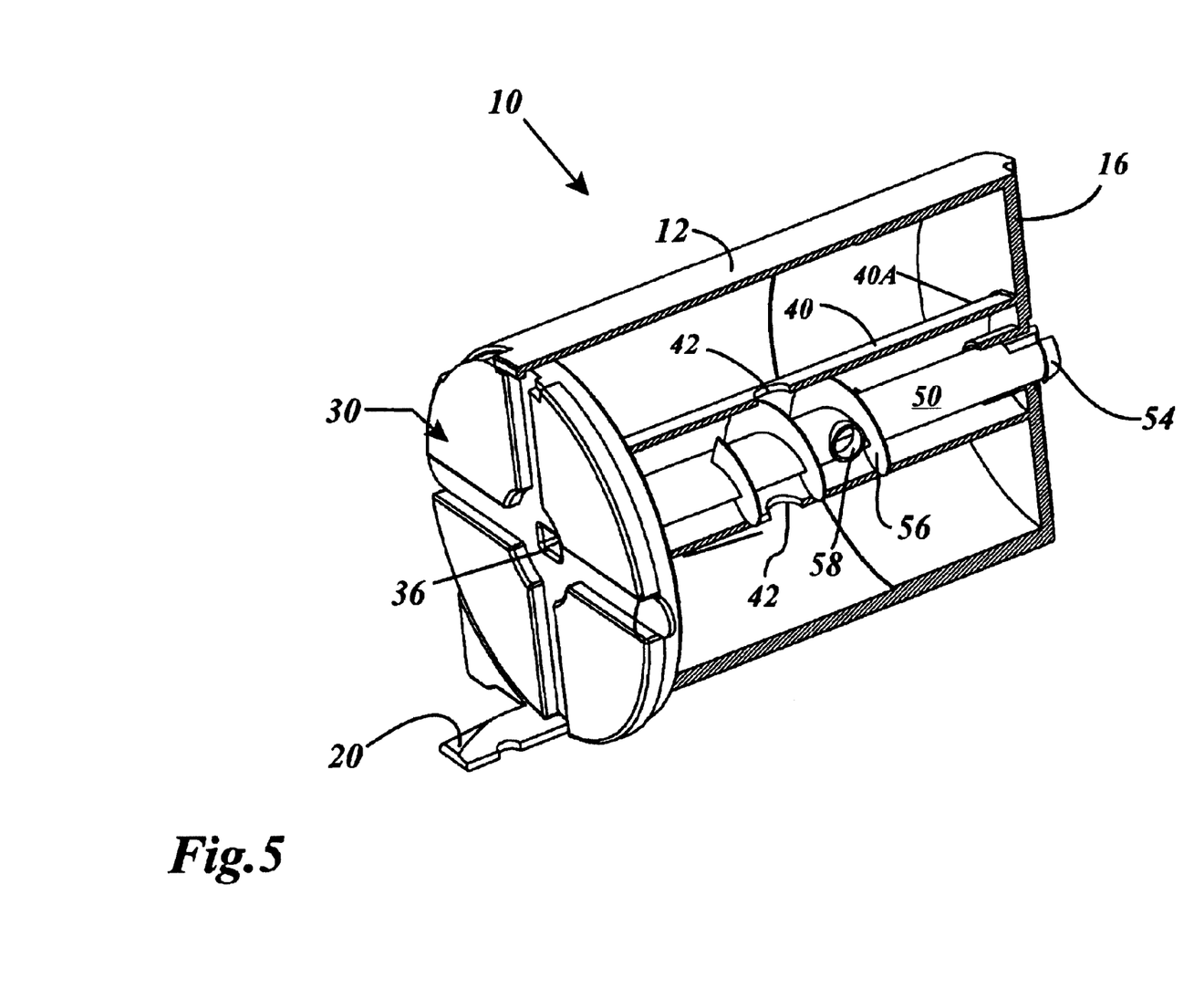
FIG. 5 is a partial side sectional view thereof.
Figure 6:
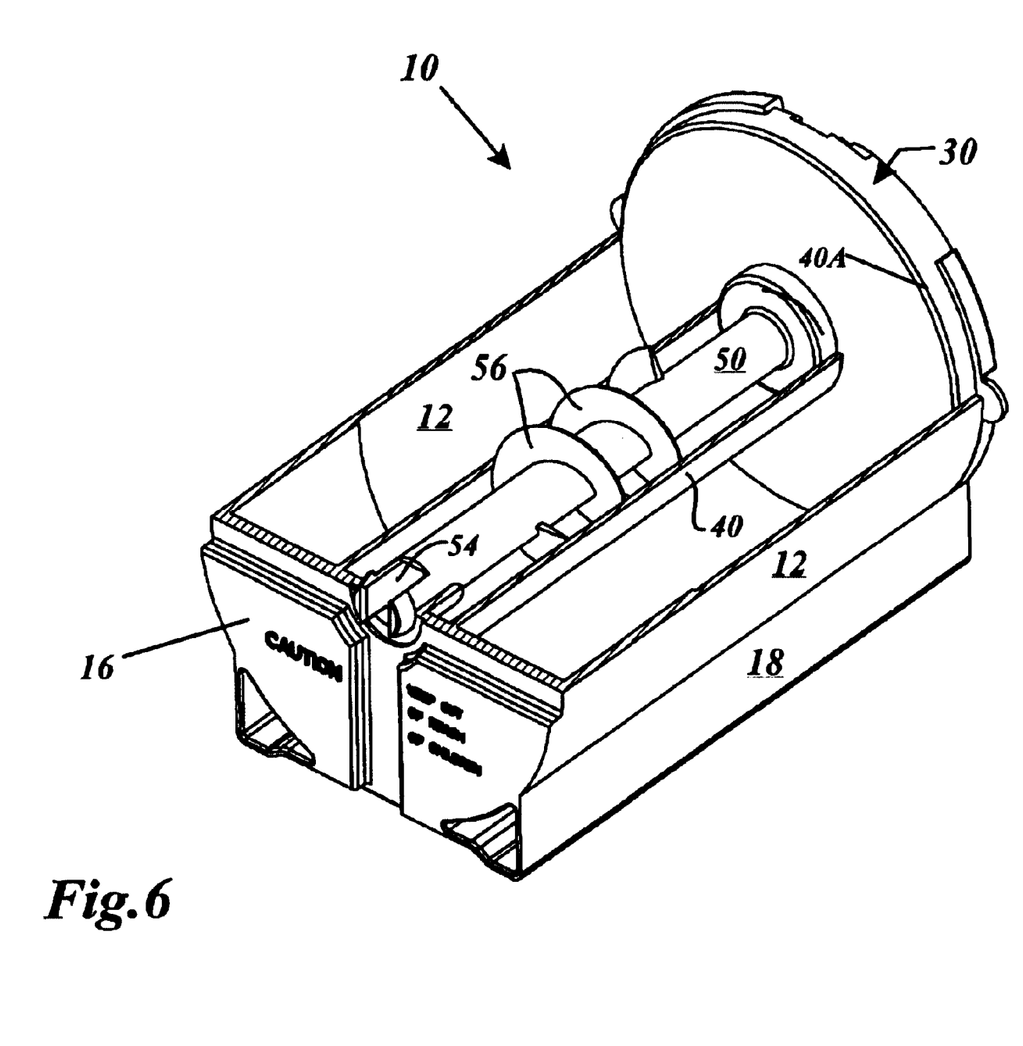
FIG. 6 is a partial top sectional view thereof.

As best seen in FIG. 3, 5, 6, housing 12 includes an end cap 30. End cap assembly 30 is adapted for removable mating engagement with housing open end 14 to form a cylindrical bait station when attached to the housing in the assembled configuration depicted in FIGS. 1, 2, 5, and 6. Secure attachment of end cap 30 to housing 12 may be facilitated by a tab, referenced as 14A, projecting from housing open end 14 to for snap-lock engagement with end cap 30. More particularly end cap 30 includes a lip that engages an outer peripheral edge of end cap 30. End cap 30 further defines a radially projecting cam 32 on at least a portion of a peripheral edge thereof for urging tab 14A from a locking position to a release position upon rotation of end cap assembly 30. In addition, end cap 30 may further include a pair of diametrically opposed projecting tabs 34 for providing grasping members to assist in rotation and removal of end cap 30.

End cap 30 has an external surface defining an axial ingress aperture 36 and a plurality of radial extending recessed channels 38 running from aperture 36 to the peripheral edge of end cap 30. Recessed channels 38 function to define insect walkways for leading insects to ingress aperture 36. Similarly end plate 16 defines an axial ingress aperture 26 and a plurality of radially extending recessed channels 28 running from aperture 26 to the peripheral edge of end plate 16. Recessed channels 26 define tunnel structures leading to ingress aperture 26 when bait station 10 is configured vertically with end plate 16 functioning as a base. Apertures 26 and 36 provide opposing ingress openings leading to the bait-containing interior for insects as more fully discussed herein.

Figure 4:
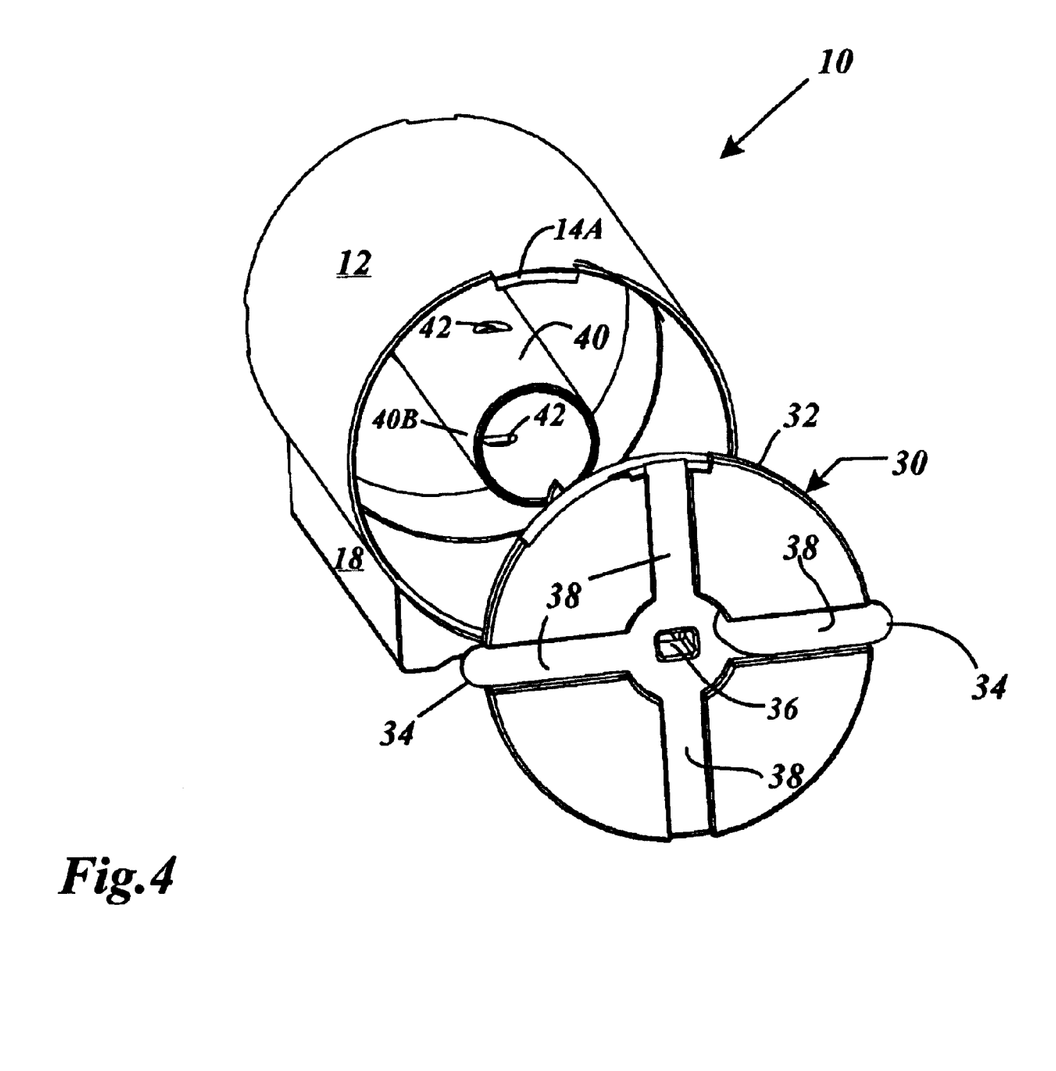
FIG. 4 is an exploded front perspective view thereof.

Turning now to the internal structure of bait station 10, housing 12 includes an internal, axially-aligned hollow tube, referenced as 40, having a first end 40A connected to housing end plate 16 and a second end 40B aligned for coextensive termination with the open end of the housing. Tube 40, and particularly first end 40A is connected to end plate 16 in surrounding relation with ingress aperture 26 formed in end plate 16. Similarly second end 40B of tube 40 is disposed in sealing mating contact with end cap 30 in surrounding relation with a collared axial aperture 36 defined therein when end cap 30 is installed in covering relation with open end 14 of housing 12. As best depicted in FIGS. 4 and 5, tube 40 further defines a pair of tube wall apertures, referenced as 42, disposed at a longitudinally intermediate position thereon, thereby placing the intermediate chamber defined by the interior of tube 40 in communication with the main chamber defined within housing 12 external to tube 40. At least one the tube apertures is preferably disposed at the underside of tube 40 to facilitate drainage of any liquid entering the tube back into the reservoir formed by housing 12.

Figure 8:
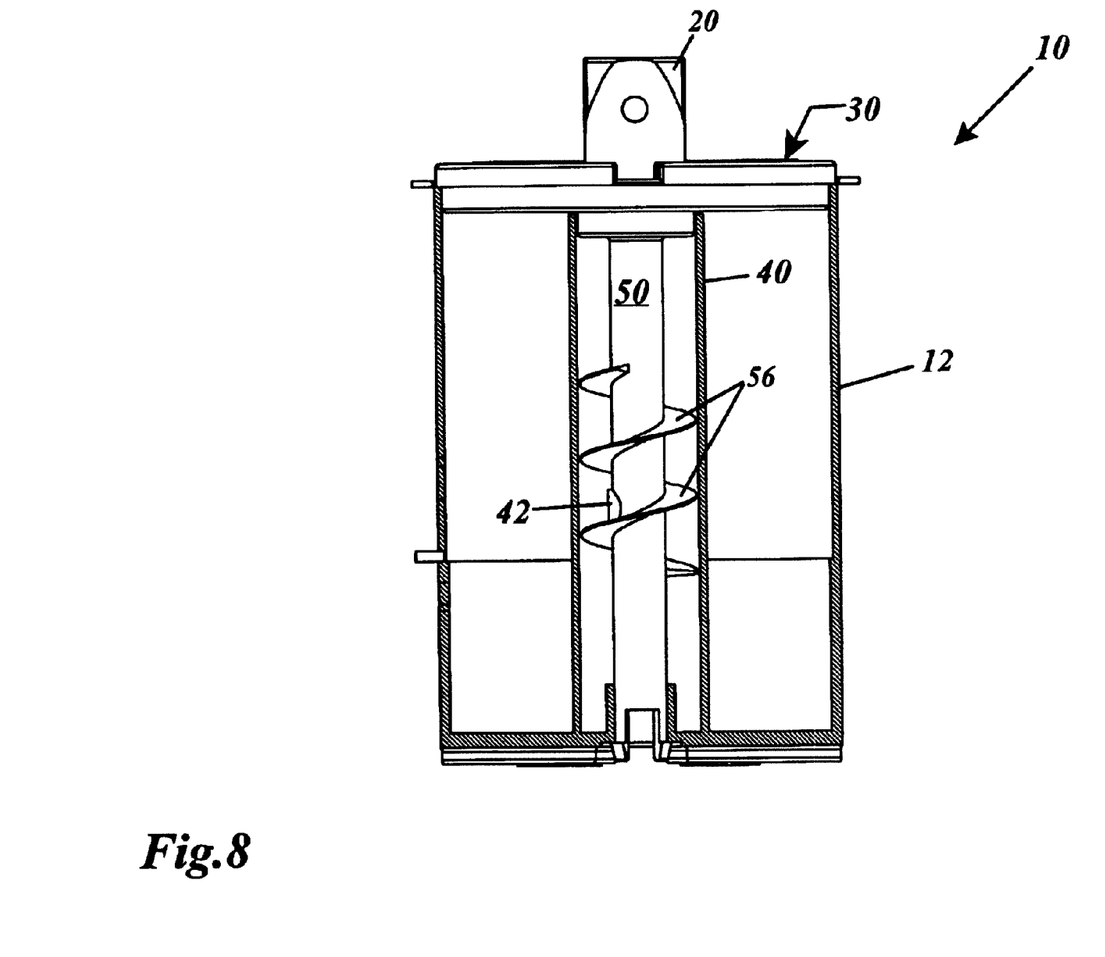
FIG. 8 is a sectional view thereof.

As depicted in FIGS. 3 and 5, end cap 30 includes an axially projecting shaft 50 sized for insertion within tube 40 as depicted in FIG. 5. Shaft 50 is substantially hollow so as to define a central chamber within housing 12. Hollow shaft 50 has a first end 50A connected to end cap 30 in surrounding relation with aperture 36, and a second end 50B adapted for snap locking inserted engagement with end plate aperture 26. More particularly, shaft second end 50B defines a pair of projecting members, referenced as 54, each terminating in a radial lip which bear against the outer surface of end plate 16 in a snap-lock configuration when cap 30 is installed and projecting members 54 are inserted through end plate aperture 26 as seen in FIGS. 5, 6, and 8.

Shaft 50 further includes a radially outwardly projecting helical flange, referenced as 56, extending from the outer surface thereof as best seen in FIG. 3. Helical flange 56 is radially sized for sealing contact with the inner surface of tube 40 when end cap 30 is connected to the open end 14 of housing 12 and shaft 30 is received Within tube 40. The space between the outer wall of shaft 50 and the inner wall of tube 40 defines an intermediate chamber concentrically disposed relative to said central chamber. Shaft 50 further defines an aperture 58 for providing communication between the hollow interior of shaft 50 and the interior of tube 40 when shaft 50 is inserted within tube 40. Aperture 58 is disposed longitudinally along shaft 50 and positioned between projecting wall portions of helical flange 58. Aperture 58 is preferably longitudinally offset from tube apertures 42 to improve spill resistance.

As previously noted, housing 12 functions as a reservoir for liquid or gel bait formulations (not shown), such as attractants and toxicants. Removal of end cap 30 provides access to the interior of housing 12 and permits the addition of a bait formulation therein. Removal of end cap 30 is accomplished by simultaneous radial depression of projecting members 54 of shaft 50 lifting of housing tab 14A and manual separation of end cap 30 from housing 12. Bait, such as a liquid, gel, or granular toxicant and/or attractant, is deposited within housing 12 external to tube 40, and end cap 30 is returned to the attached configuration depicted in FIGS. 1, 2, and 5. The amount of bait deposited in housing 12 is preferably a volume that results in a fill level that is below the bottom of tube 40 such that bait does not enter tube 40 via lower aperture 42.

As previously noted, bait station 10 may be placed in a horizontal configuration wherein base 18 functions to stabilize cylindrical housing 12, or in a vertical configuration wherein end plate 16 functions as a base. In either configuration, recessed channels 28 and 38 function as passages for insects. When bait station 10 is disposed vertically with end plate 16 functioning as a base, however, channels 28 define tunnels leading to ingress aperture 26. Regardless of the configuration, insects drawn to the bait station by the enclosed bait may enter bait station 10 through either ingress apertures 26 or 36. Upon entering bait station 10 via apertures 26 or 36 insects become exposed to liquid toxicants by passing through the interior of shaft 50 and through aperture 58 into the interior of tube 40. Upon exiting shaft 50 an insect is free to walk around the circumferential outer surface of shaft 50 confined by opposing walls formed by helical flange 56 until reaching one of the tube apertures 40. Upon arriving at one of said tube apertures 42 an insect may exit tube 40 through one of said tube apertures 42 thereby gaining access to the toxicant reservoir formed by housing 12.

As noted above, the volume of insecticide placed within housing 12 is such that the insecticide does not enter tube 40 through aperture 42. Housing 12 may further include an internal circumferential marking corresponding to the maximum fill volume when disposed in a vertical configuration to assist the user in adding the proper amount of insecticide. The maximum fill volume is an amount such that the fill level does not reach the lower portion of tube 40 when bait station 10 is disposed in the horizontal configuration. As should be apparent, the internal structure of housing 12, tube 40, and shaft 50 functions to prevent an enclosed bait formulation, such as liquid insecticide, from exiting bait station 10. More particularly, liquid insecticide contained within housing 12 can only exit bait station 10 by passing through tube apertures 42, around helical flange 56, into shaft aperture 58, and finally down shaft 50 and out one of said apertures 26 or 36. Accordingly, bait station 10 is highly resistant to spillage.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What we claim is:

1. An insect bait station comprising:
   a housing including a bait reservoir, said housing defining at least one aperture;
   said at least one housing aperture communicating with a central chamber;
   said central chamber defining an aperture communicating with a peripherally sealed spiral passage;
   said spiral passage defining an aperture communicating with said bait reservoir.

2. An insect bait station according to claim 1, wherein said housing further includes at least one exterior recessed channel having a first end terminating at a peripheral edge portion of said housing and a second end communicating with said housing aperture.

3. An insect bait station according to claim 1, further including:
   an anchoring tab projecting from said housing, said anchoring tab defining an aperture, whereby said housing is anchored by insertion of an anchoring spike through said anchoring tab aperture.

4. An insect bait station comprising:
   a housing including an internal bait reservoir;
   said housing having first and second outer surface portions, said first and second outer surface portions each defining an ingress aperture;
   each of said first and second ingress apertures communicating with an internal chamber;
   said internal chamber defining an aperture communicating with a spiral passage, said spiral passage bounded by a floor, a ceiling, and opposing sidewalls;
   said spiral passage defining an aperture communicating with said internal bait reservoir.

5. An insect bait station according to claim 4, wherein said first and second outer surface portions are generally planar and each define at least one recessed channel running from a peripheral edge thereof to said ingress aperture.

6. An insect bait station comprising:
   a housing defining an interior reservoir defined by a closed end, a wall connected to said closed end, said wall projecting from said closed end and forming an open end, and a detachable end cap connected to said open end;
   said closed end defining an aperture and including a tubular member having a first end connected to said closed end in surrounding relation with said aperture, said tubular member having a tube wall projecting from said first end to a second end terminating coextensive with said housing open end;
   said tubular member having at least one aperture defined within said tube wall between said first and second tubular member ends;
   said end cap defining an aperture and including a hollow shaft having a first end connected to said end cap in surrounding relation with said aperture, said hollow shaft having a shaft wall projecting from said first end to a second end, said second shaft end in communication with the aperture defined by said closed end;
   said hollow shaft generally concentrically disposed within said tubular member;
   said shaft wall including spiral flange projecting radially outward therefrom, said spiral flange having an edge portion in sealing engagement with the internal surface of said tubular member;
   said shaft wall defining an aperture defined between projecting portions of said spiral flange communicating with the interior of said tubular member.

7. An insect bait station according to claim 6, wherein said closed end has an outer surface defining at least one recessed channel having a first end disposed in proximity to a peripheral edge of said first end and a second end disposed in proximity to said closed end aperture.

* * * * *